(12) United States Patent
Kawamoto et al.

(10) Patent No.: US 9,447,200 B2
(45) Date of Patent: Sep. 20, 2016

(54) METHOD FOR PRODUCING STABILIZED POLYMER

(75) Inventors: Naoshi Kawamoto, Saitama (JP);
Tsuyoshi Urushihara, Saitama (JP);
Kohei Okamoto, Saitama (JP); Tetsuya Seguchi, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 13/817,400

(22) PCT Filed: Aug. 18, 2011

(86) PCT No.: PCT/JP2011/068688
§ 371 (c)(1),
(2), (4) Date: Feb. 15, 2013

(87) PCT Pub. No.: WO2012/032908
PCT Pub. Date: Mar. 15, 2012

(65) Prior Publication Data
US 2013/0144020 A1 Jun. 6, 2013

(30) Foreign Application Priority Data
Sep. 10, 2010 (JP) ................. 2010-203622

(51) Int. Cl.
C08F 4/44 (2006.01)
C08F 2/00 (2006.01)
C08F 4/00 (2006.01)
C08G 18/48 (2006.01)
C08K 5/49 (2006.01)
C08K 5/05 (2006.01)
C08F 2/44 (2006.01)
C08K 5/00 (2006.01)
(Continued)

(52) U.S. Cl.
CPC . *C08F 2/00* (2013.01); *C08F 2/44* (2013.01); *C08K 5/0091* (2013.01); *C08K 5/527* (2013.01); *C08F 2/40* (2013.01); *C08K 5/5317* (2013.01); *C08K 5/5357* (2013.01)

(58) Field of Classification Search
CPC .............. C08F 4/06; C08F 2/00; C08F 4/44; C08F 4/00; B01J 31/00; B01J 27/00; C08G 18/48; C08K 5/49; C08K 5/05
USPC ......... 526/212, 185, 193, 210; 524/710, 765
See application file for complete search history.

(56) References Cited

U.S. PATENT DOCUMENTS 2,954,345 A 9/1960 Filbey
4,386,011 A 5/1983 Fodor
(Continued)

FOREIGN PATENT DOCUMENTS

EP 0070039 A2 * 1/1983 .............. C08F 10/00
EP 0070039 A2 1/1983
(Continued)

OTHER PUBLICATIONS

English translation of JP 2006052241 A.*
(Continued)

*Primary Examiner* — Alexa Neckel
*Assistant Examiner* — Elizabeth Eng
(74) *Attorney, Agent, or Firm* — Birch, Stewart, Kolasch & Birch, LLP

(57) ABSTRACT

Provided is a method of producing a stabilized polymer in which inhibition of polymerization of a monomer having an ethylenically unsaturated bond is suppressed even when a specific phenolic antioxidant is added before or during the polymerization of the monomer.

The method of producing a stabilized polymer is characterized by comprising the step of adding at least one phenolic antioxidant which is represented by the following Formula (I), (II) or (III) and masked with an organic aluminum to a catalyst system or a polymerization system before or during polymerization of a monomer having an ethylenically unsaturated bond:

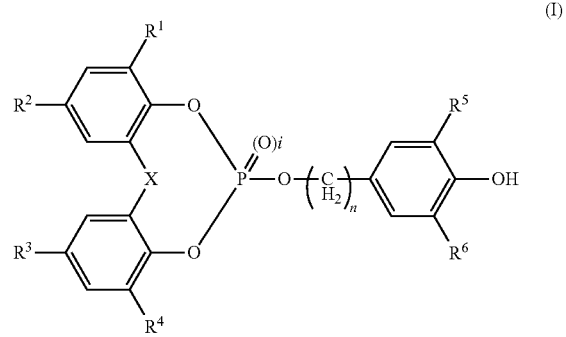

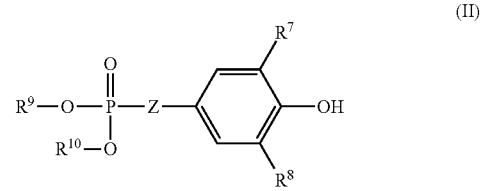

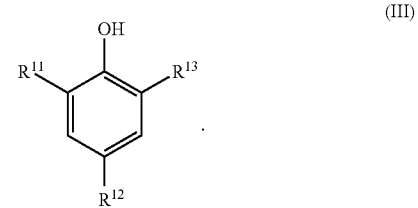

5 Claims, No Drawings

(51) Int. Cl.
*C08K 5/527* (2006.01)
*C08F 2/40* (2006.01)
*C08K 5/5357* (2006.01)
*C08K 5/5317* (2006.01)

(56) References Cited

U.S. PATENT DOCUMENTS

| | | |
|---|---|---|
| 2002/0161080 A1 | 10/2002 | Hoffmann et al. |
| 2008/0214752 A1 | 9/2008 | Tobita et al. |
| 2009/0069171 A1* | 3/2009 | Sagae ............... C08F 10/00 502/83 |
| 2011/0065876 A1 | 3/2011 | Okamoto et al. |
| 2011/0288216 A1 | 11/2011 | Ayabe et al. |
| 2012/0022212 A1 | 1/2012 | Ayabe et al. |

FOREIGN PATENT DOCUMENTS

| | | |
|---|---|---|
| EP | 0546573 A1 | 6/1993 |
| JP | 5-271335 A | 10/1993 |
| JP | 2005-206625 A | 8/2005 |
| JP | 2005206625 A * | 8/2005 .............. C08F 4/649 |
| JP | 2005-255953 A | 9/2005 |
| JP | 2006-52241 A | 2/2006 |
| JP | 2006052241 A * | 2/2006 |
| JP | 2006-282985 A | 10/2006 |
| JP | 2006282985 A * | 10/2006 |
| WO | WO 94/07951 A1 | 4/1994 |
| WO | WO 95/25767 A1 | 9/1995 |
| WO | 2006/095667 A1 | 9/2006 |
| WO | 2009/147967 A1 | 12/2009 |
| WO | WO 2010/087063 A1 | 8/2010 |
| WO | WO 2010/087064 A1 | 8/2010 |

OTHER PUBLICATIONS

English translation of JP 2005206625 A.*
PCT/ISA/210—International Search Report mailed on Nov. 29, 2011, issued in PCT/JP2011/068688.
Extended European Search Report and Communication for Application No. 15154391.5 dated Apr. 30, 2015.
European Search Report dated Sep. 30, 2014 for European Application No. 14176179.1.

\* cited by examiner

METHOD FOR PRODUCING STABILIZED POLYMER

TECHNICAL FIELD

The present invention relates to a method of producing a stabilized polymer. More particularly, the present invention relates to a method of producing a stabilized polymer in which inhibition of polymerization of a monomer having an ethylenically unsaturated bond is suppressed even when a specific phenolic antioxidant is added before or during the polymerization of the monomer.

BACKGROUND ART

Polymers have poor stability against heat and light and are, therefore, easily oxidized and degraded when exposed to a high-temperature environment or a strong light, so that the service life required for a plastic article cannot be attained. In order to prevent such oxidation and degradation, stabilizers such as a phenolic antioxidant, a phosphorus-based antioxidant, a sulfur-based antioxidant, a hydroxylamine compound, a hindered amine compound, an ultraviolet absorber and an acid scavenger are commonly added. In particular, phenolic antioxidants have high stabilization effect against thermal oxidation of a polymer obtained from a monomer having an ethylenically unsaturated bond, such as polyolefin, and are capable of imparting the polymer with resistance against oxidation and discoloration during storage; therefore, phenolic antioxidants have high utility value as a stabilizer of a polymer obtained from a monomer having an ethylenically unsaturated bond, such as polyolefin.

Conventionally, in the stabilization of a polymer obtained from a monomer having an ethylenically unsaturated bond such as polyolefin, a long-term stabilization is attained by blending a variety of stabilizers into a fine powder-form polymer obtained by using a Ziegler catalyst and/or a metallocene catalyst and then molding the resulting polymer using a granulator or the like into the form of granules that are easy to handle.

However, because of the recent advance of the polymerization technologies, it is now possible to directly obtain a polymer in the form of granules. Since the blending of a stabilizer for stabilization of a polymer and the subsequent molding of the polymer into the form of granules using a granulator expose the polymer to a high-temperature environment in the melt-kneading step thereof, deterioration of the physical properties of the polymer, such as a reduction in the molecular weight, is inevitable. In addition, the need of adding an excessive amount of stabilizer to mitigate the poor dispersion thereof is economically disadvantageous.

In view of this, in order to omit the step of blending a stabilizer by melt-kneading of a polymer, methods in which a stabilizer is added before or during the polymerization of a monomer have been researched and developed; however, there is still a problem that phenolic antioxidants have an effect of inhibiting the catalytic activities of polymerization catalysts.

For example, in Patent Document 1, it is described that phenolic antioxidants that are widely used in polyolefins, such as tetrakis(3-(3,5-di-tert-butyl-4-hydroxyphenyl)propionyloxymethyl)methane, inhibit the catalytic activities of polymerization catalysts and that such phenolic antioxidants, therefore, cannot be added before polymerization. In Patent Document 1, a method in which a complex is formed by an ether compound on a Ziegler catalyst supported on magnesium chloride is proposed.

In addition, in Patent Documents 2 to 4, the present inventors have proposed methods of stabilizing a polymer without impairing the activity of a polymerization catalyst, which comprise the step of masking a phenolic antioxidant by mixing it with an organic aluminum compound usually used in olefin polymerization in an existing catalyst feed tank or polymerization vessel.

RELATED ART DOCUMENTS

Patent Documents

Patent Document 1: Japanese Unexamined Patent Application Publication No. H5-271335 (in particular, Claims and Comparative Example 1)

Patent Document 2: Japanese Unexamined Patent Application Publication No. 2005-206625 (in particular, Claims)

Patent Document 3: Japanese Unexamined Patent Application Publication No. 2005-255953 (in particular, Claims)

Patent Document 4: Japanese Unexamined Patent Application Publication No. 2006-282985 (in particular, Claims)

SUMMARY OF THE INVENTION

Problems to be Solved by the Invention

However, in the method disclosed in Patent Document 1, the treatment process of the catalyst is complicated; therefore, there is a demand for a method of stabilizing a polymer which is more convenient and does not restrict the catalytic actions. Moreover, in Patent Documents 2 to 4, there is no mention with regard to a phenolic antioxidant having an ether bond or a thioether bond in the molecule.

Therefore, an object of the present invention is to provide a method of producing a stabilized polymer in which inhibition of polymerization of a monomer having an ethylenically unsaturated bond is suppressed even when a specific phenolic antioxidant is added before or during the polymerization of the monomer.

Means for Solving the Problems

The present inventors intensively studied in order to solve the above-described problems and discovered that, even when a specific phenolic antioxidant which has an ether bond or a thioether bond and is masked with an organic aluminum compound is added before or during polymerization of a monomer, a sufficiently stabilized polymer can be obtained while the activity of a polymerization catalyst is prevented from being inhibited, thereby completing the present invention.

That is, the method of producing a stabilized polymer according to the present invention is characterized by comprising the step of adding at least one phenolic antioxidant which is represented by the following Formula (I), (II) or (III) and masked with an organic aluminum compound to a catalyst system or a polymerization system before or during polymerization of a monomer having an ethylenically unsaturated bond:

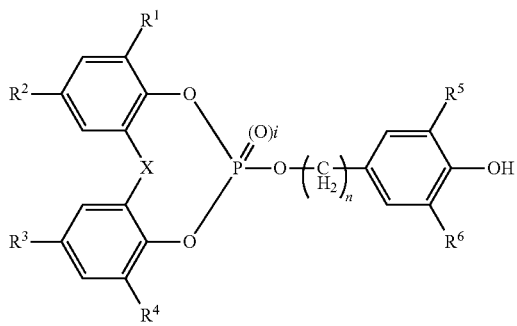

(I)

(wherein, $R^1$, $R^2$, $R^3$, $R^4$, $R^5$ and $R^6$ each independently represent a hydrogen atom, an alkyl group having 1 to 5 carbon atoms which is optionally branched or substituted, a cycloalkyl group having 5 to 8 carbon atoms which is optionally substituted or an aryl group having 6 to 12 carbon atoms which is optionally substituted; X represents a direct bond or an alkylidene group having 1 to 4 carbon atoms; i represents a number of 0 or 1; and n represents a number of 1 to 6);

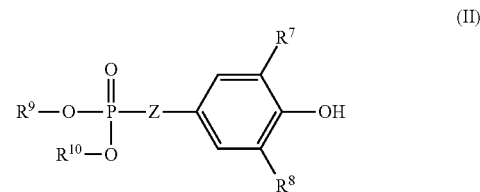

(II)

(wherein, $R^7$ and $R^8$ each independently represent a hydrogen atom, an alkyl group having 1 to 5 carbon atoms which is optionally branched or substituted, a cycloalkyl group having 5 to 8 carbon atoms which is optionally substituted or an aryl group having 6 to 12 carbon atoms which is optionally substituted; $R^9$ and $R^{10}$ each independently represent an alkyl group having 1 to 18 carbon atoms which is optionally branched or substituted or a metal atom; when the metal atom is a divalent or higher-valent metal, $R^9$ and $R^{10}$ are optionally the same metal atom; and Z represents an alkylene group having 1 to 4 carbon atoms which is optionally branched or substituted); or

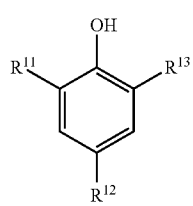

(III)

(wherein, $R^{11}$, $R^{12}$ and $R^{13}$ each independently represent an alkyl group having 1 to 18 carbon atoms which is optionally branched or substituted or an alkyl group having 2 to 18 carbon atoms which has an ether bond, a thioether bond or a disulfide bond and is optionally branched, with the proviso that at least one of $R^{11}$, $R^{12}$ and $R^{13}$ is an alkyl group having 2 to 18 carbon atoms which has an ether bond, a thioether bond or a disulfide bond and is optionally branched).

In the method of producing a stabilized polymer according to the present invention, it is preferred that the above-described phenolic antioxidant be added in an amount of 0.001 to 0.5 parts by mass with respect to 100 parts by mass of a polymer obtained by polymerization of the monomer having an ethylenically unsaturated bond.

Further, in the method of producing a stabilized polymer according to the present invention, it is preferred that the above-described organic aluminum compound be a trialkyl aluminum.

Further, it is preferred that the method of producing a stabilized polymer according to the present invention further comprise the step of adding a phosphorus-based antioxidant to the catalyst system or the polymerization system before or during the polymerization of the monomer having an ethylenically unsaturated bond.

Further, in the method of producing a stabilized polymer according to the present invention, it is preferred that the above-described monomer having an ethylenically unsaturated bond be an α-olefin.

The olefin polymer according to the present invention is characterized by being obtained by the above-described method of producing a stabilized polymer.

Effects of the Invention

By the present invention, a method of producing a stabilized polymer in which inhibition of polymerization of a monomer having an ethylenically unsaturated bond is suppressed even when a specific phenolic antioxidant is added before or during the polymerization of the monomer can be provided.

MODE FOR CARRYING OUT THE INVENTION

The phenolic antioxidant used in the present invention is a compound represented by the above-described Formula (I), (II) or (III).

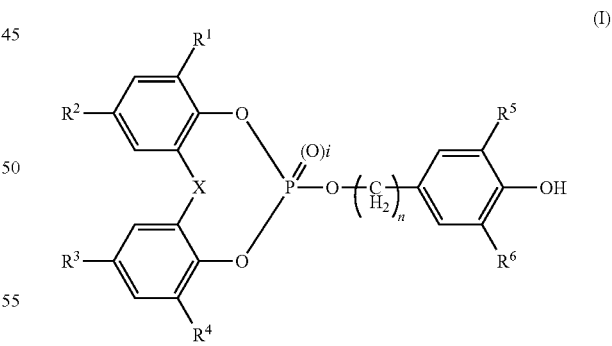

(I)

(wherein, $R^1$, $R^2$, $R^3$, $R^4$, $R^5$ and $R^6$ each independently represent a hydrogen atom, an alkyl group having 1 to 5 carbon atoms which is optionally branched or substituted, a cycloalkyl group having 5 to 8 carbon atoms which is optionally substituted or an aryl group having 6 to 12 carbon atoms which is optionally substituted; X represents a direct bond or an alkylidene group having 1 to 4 carbon atoms; i represents a number of 0 or 1; and n represents a number of 1 to 6).

Examples of the alkyl group having 1 to 5 carbon atoms which is optionally branched or substituted and represented by $R^1$, $R^2$, $R^3$, $R^4$, $R^5$ and $R^6$ in the above-described Formula (I) include methyl group, ethyl group, propyl group, isopropyl group, butyl group, sec-butyl group, tert-butyl group, isobutyl group, pentyl group, isopentyl group and tert-pentyl group. These alkyl groups are also optionally interrupted by an oxygen atom, a sulfur atom or the later-described aryl group having 6 to 12 carbon atoms, and the hydrogen atoms in these alkyl groups are also optionally substituted with a hydroxy group, a cyano group, an alkenyl group, a chain aliphatic group such as an alkenyloxy group, pyrrole, furan, thiophene, imidazole, oxazole, thiazole, pyrazole, isoxazole, isothiazole, pyridine, pyridazine, pyrimidine, pyrazine, piperidine, piperazine, morpholine, 2H-pyran, 4H-pyran, phenyl, biphenyl, triphenyl, naphthalene, anthracene, pyrrolidine, pyrindine, indolizine, indole, isoindole, indazole, purine, quinolizine, quinoline, isoquinoline or a cyclic aliphatic group such as a cycloalkyl group. In addition, these interruptions or substitutions may also exist in combination.

Examples of the cycloalkyl group having 5 to 8 carbon atoms which is optionally substituted and represented by $R^1$, $R^2$, $R^3$, $R^4$, $R^5$ and $R^6$ in the above-described Formula (I) include cyclopentyl group, cyclohexyl group, cycloheptyl group and cyclooctyl group. The hydrogen atoms in these cycloalkyl groups are optionally substituted with an alkyl group, an alkenyl group, an alkenyloxy group, a hydroxy group or a cyano group. The alkyl group is also optionally branched and/or interrupted by an oxygen atom or a sulfur atom.

Examples of the aryl group having 6 to 12 carbon atoms which is optionally substituted and represented by $R^2$, $R^3$, $R^4$, $R^5$ and $R^6$ in the above-described Formula (I) include phenyl group, methylphenyl group, p-tolyl group, o-tolyl group, m-tolyl group, butylphenyl group, 4-hydroxyphenyl group, 3,4,5-trimethoxyphenyl group, 4-tert-butylphenyl group, 2,4-di-tert-butylphenyl group, 3,5-di-tert-butylphenyl group, biphenyl group and naphthyl group. The hydrogens atom in these aryl groups are optionally substituted with a hydroxy group, a cyano group, a halogen atom, the above-described chain aliphatic group or the above-described cyclic aliphatic group. The alkyl group is also optionally branched and/or interrupted by an oxygen atom or a sulfur atom.

Examples of the alkylidene group having 1 to 4 carbon atoms which is represented by X in the above-described Formula (I) include methylene group, ethylidene group, isopropylidene group, propylidene group and butylidene group.

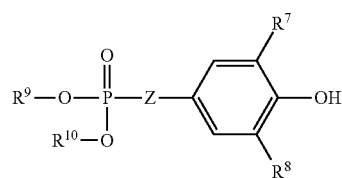

(II)

(wherein, $R^7$ and $R^8$ each independently represent a hydrogen atom, an alkyl group having 1 to 5 carbon atoms which is optionally branched or substituted, a cycloalkyl group having 5 to 8 carbon atoms which is optionally substituted or an aryl group having 6 to 12 carbon atoms which is optionally substituted; $R^9$ and $R^{10}$ each independently represent an alkyl group having 1 to 18 carbon atoms which is optionally branched or substituted or a metal atom; when the metal atom is a divalent or higher-valent metal, $R^9$ and $R^{10}$ are optionally the same metal atom; and Z represents an alkylene group having 1 to 4 carbon atoms which is optionally branched or substituted).

Examples of the alkyl group having 1 to 5 carbon atoms which is optionally branched or substituted, the cycloalkyl group having 5 to 8 carbon atoms which is optionally substituted and the aryl group having 6 to 12 carbon atoms which is optionally substituted, all of which groups are represented by $R^7$ and $R^8$ in the above-described Formula (II), include the same ones as those exemplified for above-described Formula (I), respectively.

Examples of the alkyl group having 1 to 18 carbon atoms which is optionally branched or substituted and represented by $R^9$ and $R^{10}$ in the above-described Formula (II) include methyl group, ethyl group, propyl group, isopropyl group, butyl group, isoamyl group, hexyl group, 2-ethylhexyl group, nonyl group, 3,5,5-trimethylhexyl group, isodecyl group, dodecyl group, isotridecyl group, tetradecyl group, hexadecyl group, heptadecyl group, octadecyl group, trifluoromethyl group, chloromethyl group, bromoethyl group, cyclohexyl group and 2-butoxyethyl group. These alkyl groups are optionally branched and the hydrogen atoms in these alkyl groups are optionally substituted with a hydroxy group, a cyano group, a halogen atom, the above-described chain aliphatic group or the above-described cyclic aliphatic group.

Examples of the metal atom represented by $R^9$ and $R^{10}$ in the above-described Formula (II) include lithium, sodium, potassium, magnesium, calcium and Al(OH).

Examples of the alkylene group having 1 to 4 carbon atoms which is optionally branched or substituted and represented by Z in the above-described Formula (II) include methylene group, ethylene group, propylene group and butene group. These alkylene groups are optionally branched and the hydrogens atom in these alkylene groups are optionally substituted with a hydroxy group, a cyano group, a halogen atom, the above-described chain aliphatic group or the above-described cyclic aliphatic group.

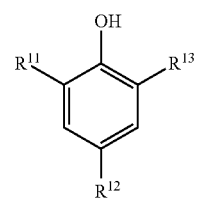

(III)

(wherein, $R^{11}$, $R^{12}$ and $R^{13}$ each independently represent an alkyl group having 1 to 18 carbon atoms which is optionally branched or substituted or an alkyl group having 2 to 18 carbon atoms which has an ether bond, a thioether bond or a disulfide bond and is optionally branched, with the proviso that at least one of $R^{11}$, $R^{12}$ and $R^{13}$ is an alkyl group having 2 to 18 carbon atoms which has an ether bond, a thioether bond or a disulfide bond and is optionally branched).

Examples of the alkyl group having 1 to 18 carbon atoms which is optionally branched or substituted and represented by $R^{11}$, $R^{12}$ and $R^{13}$ in the above-described Formula (III) include the same ones as those exemplified for the alkyl group which is optionally branched or substituted and represented by $R^9$ and $R^{10}$ in the above-described Formula (II). Examples of the alkyl group having 2 to 18 carbon atoms which has an ether bond, a thioether bond or a disulfide bond include those which contain one or more ether bonds, thioether bonds or disulfide bonds in the main chain of the above-described alkyl groups.

Specific examples of the structure of the phenolic antioxidant represented by the above-described Formula (I) include the following compounds. However, the present invention is not restricted to the following compounds by any means.

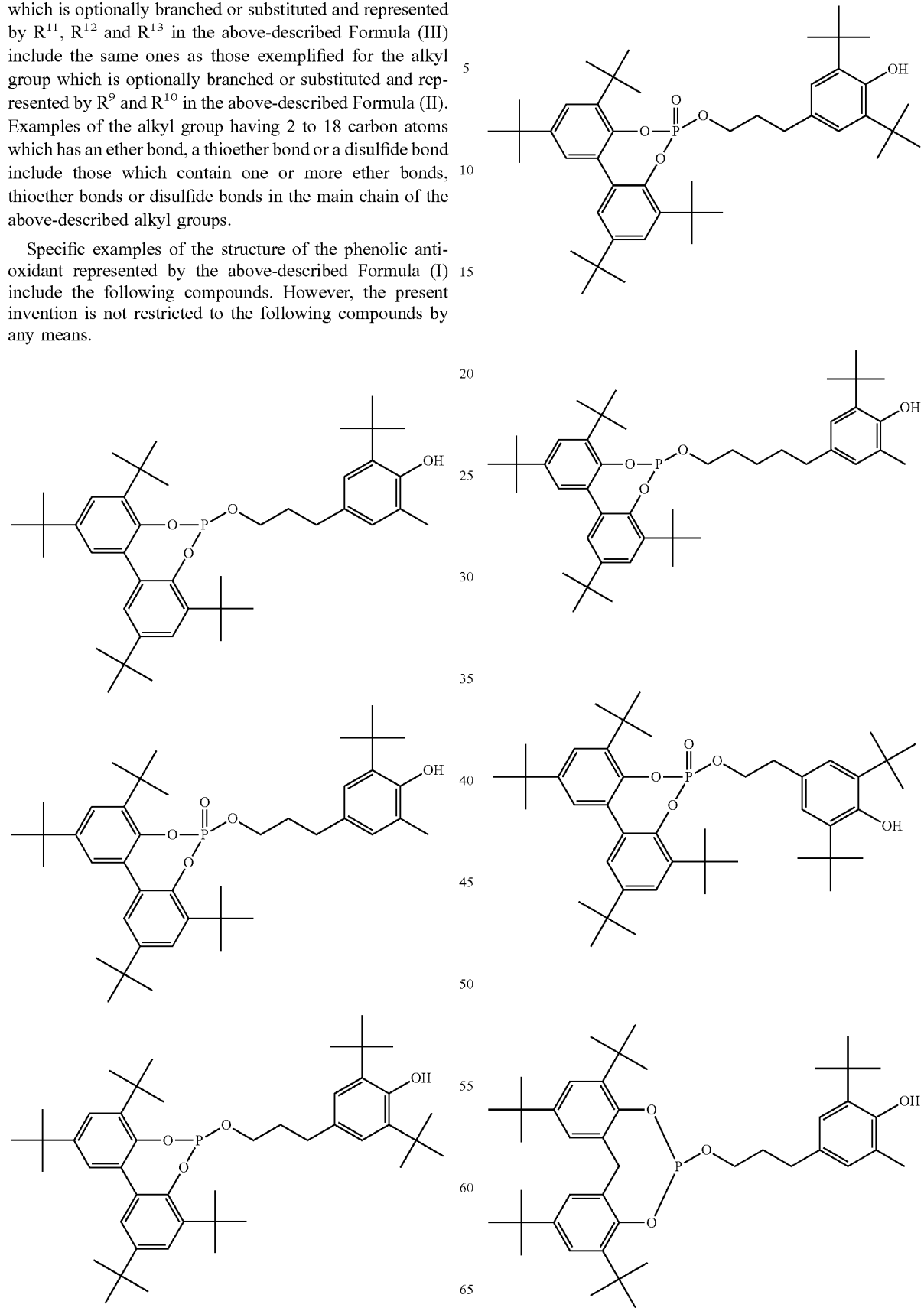

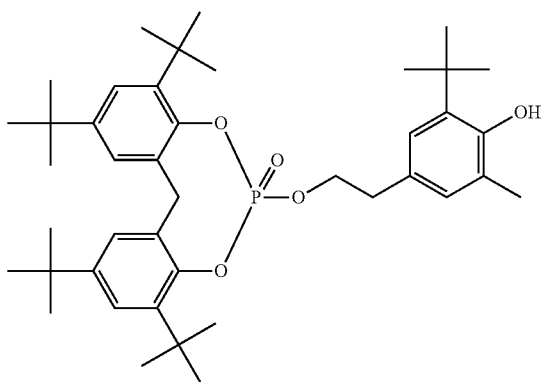

Specific examples of the structure of the phenolic antioxidant represented by the above-described Formula (II) include the following compounds. However, the present invention is not restricted to the following compounds by any means.

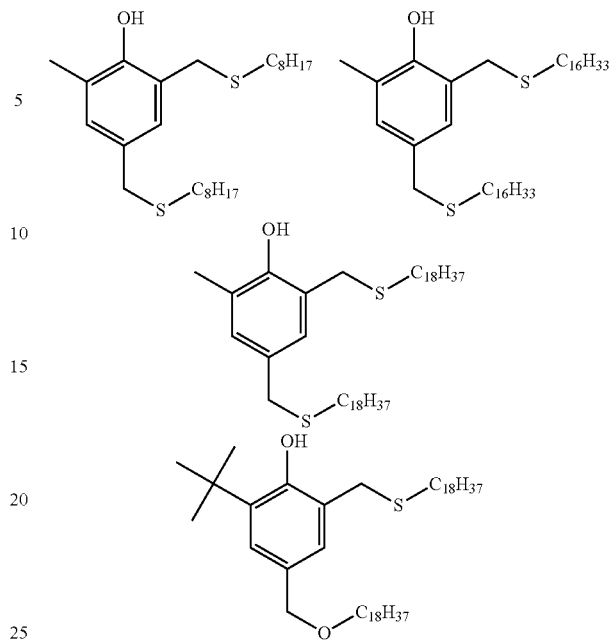

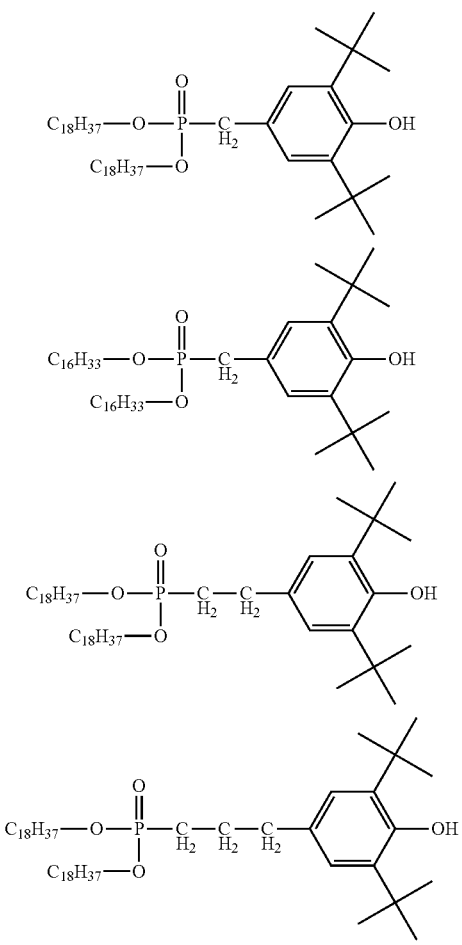

Specific examples of the structure of the phenolic antioxidant represented by the above-described Formula (III) include the following compounds. However, the present invention is not restricted to the following compounds by any means.

The phenolic antioxidant represented by the above-described Formula (I), (II) or (III) is added in an amount of preferably 0.001 to 0.5 parts by mass, more preferably 0.005 to 0.3 parts by mass, with respect to 100 parts by mass of a polymer obtained by polymerization of a monomer having an ethylenically unsaturated bond.

The production method according to the present invention comprises the step of adding at least one of the above-described phenolic antioxidants masked with an organic aluminum compound to a catalyst system or a polymerization system before or during polymerization of a monomer having an ethylenically unsaturated bond. The method of adding the masked phenolic antioxidant(s) is not particularly restricted. Examples of the suitable mode thereof include one in which the masked phenolic antioxidant(s) is/are added and mixed in a catalyst feed tank, a polymerization apparatus or a production line. As for other steps such as the step of preparing a catalyst, the step of adding the catalyst, the step of supplying a monomer which is a starting material, the step of polymerizing the monomer and the step of recovering a polymerization product, those steps that are known in the polymerization method of a monomer having an ethylenically unsaturated bond can be employed.

The masking of the phenolic antioxidant can be performed by mixing and stirring an organic aluminum compound and the phenolic antioxidant in an inert solvent. By the mixing and stirring, hydrogen of the phenolic hydroxyl group of the phenolic antioxidant is substituted with the organic aluminum compound. The above-described phenolic antioxidant and organic aluminum compound may also be mixed with stirring before being added to the catalyst system or the polymerization system. Alternatively, the above-described phenolic antioxidant and organic aluminum may be added separately to the catalyst system or the polymerization system and then mixed.

In cases where the compound produced as a by-product in the masking reaction of the phenolic antioxidant does not affect the polymerization reaction of the monomer or the resulting polymer, the masked phenolic antioxidant may be used as is; however, in cases where the by-product compound inhibits the polymerization, it is preferred to remove the compound by vacuum distillation or the like before adding the masked phenolic antioxidant to the catalyst system or the polymerization system.

It is desired that the above-described masked phenolic antioxidant be capable of undergoing a reaction with a hydrogen-donating compound such as water, an alcohol or an acid, which is added as an inactivation treatment of the polymerization catalyst after the polymerization, to generate a phenol.

Examples of the above-described organic aluminum compound include alkyl aluminums and alkyl aluminum hydrides, and the organic aluminum compound is preferably an alkyl aluminum, particularly preferably a trialkyl aluminum. Examples of the trialkyl aluminum include trimethyl aluminum, triethyl aluminum, tri-n-propyl aluminum, tri-isobutyl aluminum, tri-n-hexyl aluminum and tri-n-octyl aluminum, and these compounds may be used individually or in combination in the form of a mixture. In addition, an aluminoxane obtained by a reaction between an alkyl aluminum or an alkyl aluminum hydride and water can also be used in the same manner.

Examples of the above-described inert solvent include aliphatic and aromatic hydrocarbon compounds. Examples of the aliphatic hydrocarbon compounds include saturated hydrocarbon compounds such as n-pentane, n-hexane, n-heptane, n-octane, isooctane and refined kerosene; and cyclic saturated hydrocarbon compounds such as cyclopentane, cyclohexane and cycloheptane. Examples of the aromatic hydrocarbon compounds include benzene, toluene, ethylbenzene and xylene. Among these compounds, n-hexane, n-heptane or a gasoline fraction is preferably used. The concentration of the organic aluminum compound in the inert solvent is preferably 0.001 to 0.5 mol/L, particularly preferably 0.01 to 0.1 mol/L.

Examples of the monomer used in the present invention which has an ethylenically unsaturated bond include ethylene, propylene, 1-butene, 1-hexene, 3-methyl-1-butene, 3-methyl-1-pentene, 4-methyl-1-pentene, vinylcycloalkane, styrene and derivatives of these monomers.

The monomer used in the present invention which has an ethylenically unsaturated bond may be one of the above-described monomers or a combination of two or more thereof; however, it is preferably ethylene or a combination of α-olefin monomers. The monomer used in the present invention may also be, for example, ethylene by itself, a combination of ethylene and propylene, a combination of ethylene, propylene and butene, or a combination of an α-olefin monomer and non-conjugated diene monomer.

The above-described polymerization is performed in an inert gas atmosphere such as nitrogen in the presence of a polymerization catalyst; however, it may also be performed in the above-described inert solvent. Further, an active hydrogen compound, a particulate carrier, an organic aluminum compound, an ion-exchanging layered compound and/or an inorganic silicate may also be added in such an amount which does not inhibit the polymerization.

The above-described polymerization catalyst is not particularly restricted and any known polymerization catalyst can be employed. Examples thereof include compounds of transition metals belonging to the groups 3 to 11 of the periodic table (such as titanium, zirconium, hafnium, vanadium, iron, nickel, lead, platinum, yttrium and samarium). Representative examples of the polymerization catalyst include Ziegler-Natta catalysts composed of a Ziegler catalyst, a titanium-containing solid transition metal component and an organic metal component; and metallocene catalysts composed of a transition metal compound belonging to the group 4 to 6 of the periodic table, which has at least one cyclopentadienyl skeleton, and a co-catalyst component. Further, an electron-donating compound is preferably employed since a high-quality polymer can be obtained.

Examples of the above-described electron-donating compound include ether-based compounds, ester-based compounds, ketone-based compounds and alkoxysilane-based compounds. These electron-donating compounds may be added individually, or a plurality thereof may be added as required.

Examples of the above-described ether-based compounds include diethyl ether, dipropyl ether, diisopropyl ether, di-n-butyl ether, diethylene glycol dimethyl ether, propylene glycol dimethyl ether, ethylene oxide, tetrahydrofuran, 2,2,5,5-tetramethyl tetrahydrofuran and dioxane.

Examples of the above-described ester-based compounds include methyl acetate, ethyl acetate, n-propyl acetate, isopropyl acetate, methyl propionate, ethyl propionate, n-propyl propionate, methyl methacrylate, ethyl methacrylate, n-propyl methacrylate, ethyl phenylacetate, methyl benzoate, ethyl benzoate, phenyl benzoate, methyl toluate, ethyl toluate, methyl anisate, ethyl anisate, methyl methoxybenzoate, ethyl methoxybenzoate, methyl methacrylate, ethyl methacrylate, dimethyl phthalate, diethyl phthalate, dipropyl phthalate, dibutyl phthalate, diisobutyl phthalate, dihexyl phthalate, γ-butyrolactone and ethyl cellosolve.

Examples of the above-described ketone-based compounds include acetone, diethyl ketone, methylethyl ketone and acetophenone.

Examples of the above-described alkoxysilane-based compounds include tetramethoxysilane, ethyltrimethoxysilane, propyltrimethoxysilane, isopropyltrimethoxysilane, t-butyltrimethoxysilane, i-butyltrimethoxysilane, phenyltrimethoxysilane, cyclohexyltrimethoxysilane, diethyldimethoxysilane, dipropyldimethoxysilane, diisopropyldimethoxysilane, diphenyldimethoxysilane, t-butylmethyldimethoxysilane, t-butylethyldimethoxysilane, t-butyl-n-propyldimethoxysilane, t-butylisopropyldimethoxysilane, cyclohexylmethyldimethoxysilane, tetraethoxysilane, ethyltriethoxysilane, propyltriethoxysilane, isopropyltriethoxysilane, t-butyltriethoxysilane, phenyltriethoxysilane, cyclohexyltriethoxysilane, diethyldiethoxysilane, dipropyldiethoxysilane, diisopropyldiethoxysilane, diphenyldiethoxysilane, t-butylmethyldiethoxysilane, cyclohexylmethyldiethoxysilane and dicyclopentyldimethoxysilane.

As the method of the polymerization reaction, a conventionally used method can be employed. For example, a method of performing polymerization in a liquid phase in the presence of an inert solvent such as an aliphatic hydrocarbon (e.g. butane, pentane, hexane, heptane or isooctane), an alicyclic hydrocarbon (e.g. cyclopentane, cyclohexane or methylcyclohexane), an aromatic hydrocarbon (e.g. toluene, xylene or ethylbenzene), a gasoline fraction or a hydrogenated diesel fraction, a polymerization method in which a liquefied olefin itself is used as a medium, a method of performing polymerization in a gas phase in the substantial absence of a liquid phase, or a combination of two or more of these polymerization methods can also be employed. Further, the polymerization may be performed by either a batchwise process or a continuous process and it may also be performed by a single-step polymerization method or a multi-step polymerization method.

As a polymerization vessel used in the above-described polymerization reaction, a continuous reaction vessel in an existing polymerization equipment can be used as is, and an existing polymerization equipment can be used without any particular restriction on the size, shape and material thereof.

In the polymerization of a monomer having an ethylenically unsaturated bond, a catalyst component other than the above-described polymerization catalyst, such as a carrier, may also be included in such an amount which does not inhibit the polymerization. In cases where the catalyst is supported on a carrier, the powder properties of the monomer having an ethylenically unsaturated bond are improved, so that the granulation step can be omitted.

The type of the above-described carrier is not restricted and examples thereof include inorganic carriers such as inorganic oxides and organic carriers such as porous polyolefins. A plurality of these carriers may also be used in combination.

Examples of the above-described inorganic carriers include silica, alumina, magnesium oxide, zirconium oxide, titanium oxide, iron oxide, calcium oxide, zinc oxide, magnesium halides such as magnesium chloride and magnesium bromide and magnesium alkoxides such as magnesium ethoxide.

Further, examples of other inorganic carriers include ion-exchanging layered compounds. The term "ion-exchanging layered compounds" refers to those compounds which has a crystalline structure in which the surfaces constituted by ionic bonds and the like are laminated in parallel with each other through week bonding force and contain exchangeable ions. Specific examples of such ion-exchange layered compounds include kaolins, bentonites, talcs, kaolinites, vermiculites, montmorillonites, micas, $\alpha$-Zr(HAsO$_4$)$_2$.H$_2$O, $\alpha$-Zr(HPO$_4$)$_2$.H$_2$O, $\alpha$-Sn(HPO$_4$)$_2$.H$_2$O and $\gamma$-Ti(NH$_4$PO$_4$)$_2$.H$_2$O.

Examples of the above-described organic carriers include polyesters such as polyethylenes, polypropylenes, polystyrenes, ethylene-butene copolymers, ethylene-propylene copolymers, polymethacrylates, polyacrylates, polyacrylonitriles, polyamides, polycarbonates and polyethylene terephthalates; and polyvinyl chlorides, and these organic carriers may also be cross-linked as in the case of, for example, a styrene-divinylbenzene copolymer. Further, a catalyst which is chemically bound onto these organic carriers can also be used.

The carriers have a particle size in the range of generally 0.1 to 300 µm, preferably 1 to 200 µm, more preferably 10 to 100 µm. When the particle size is small, the resulting polymer is obtained in the form of fine powder, while when the particle size is excessively large, the handling of the resulting powder becomes difficult due to, for example, generation of coarse particles.

These carriers have a pore volume of normally 0.1 to 5 cm$^2$/g, preferably 0.3 to 3 cm$^2$/g. The pore volume can be measured by, for example, a BET method or mercury porosimetry.

In the above-described polymer, as required, other additive(s) normally used in a polymer obtained from a monomer having an ethylenically unsaturated bond may also be added. As for the method of adding such other additives, as long as they do not inhibit the polymerization, they can be added at the time of polymerizing the monomer having an ethylenically unsaturated bond and, for example, a method in which such other additives are mixed with the above-described polymer in an amount appropriate for the purpose thereof and the resulting mixture is then granulated and molded by melt-kneading using a molding machine such as an extruder may be employed.

Examples of the above-described other additives include phosphorus-based antioxidants, ultraviolet absorbers, hindered amine compounds, heavy metal inactivators, nucleating agents, flame retardants, metallic soaps, hydrotalcites, fillers, lubricants, antistatic agents, pigments, dyes and plasticizers.

Examples of the above-described phosphorus-based antioxidant include triphenyl phosphite, trisnonylphenyl phosphite, tris(2,4-di-tert-butylphenyl)phosphite, tris(2,4-di-tert-butyl-5-methylphenyephosphite, tris[2-tert-butyl-4-(3-tert-butyl-4-hydroxy-5-methylphenylthio)-5-methylphenyl] phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis (2,4-di-tert-butylphenyl)pentaerythritol diphosphite, bis(2, 6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4, 4'-n-butylidenebis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis (4,6-di-tert-butylphenyl)-2-ethylhexyl phosphite, 2,2'-methylenebis(4,6-di-tert-butylphenyl)-octadecyl phosphite, 2,2'-ethylidenebis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine and a phosphite of 2-ethyl-2-butylpropylene glycol and 2,4,6-tri-tert-butylphenol, and a phosphorus-based antioxidant which does not adversely affect the polymerization even when it is added before the polymerization, such as tris(2,4-di-tert-butylphenyl)phosphite, is preferred.

The above-described phosphorus-based antioxidant is used in an amount of preferably 0.001 to 3 parts by weight, more preferably 0.005 to 0.5 parts by weight, with respect to 100 parts by mass of the above-described polymer.

Examples of the above-described ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to C13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenylsalicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate and behenyl(3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl)acrylate; and a variety of metal salts or metal chelates, particular salts or chelates of nickel and chromium.

The above-described ultraviolet absorber is used in an amount of preferably 0.001 to 5 parts by mass, more preferably 0.005 to 0.5 parts by mass, with respect to 100 parts by mass of the above-described polymer.

Examples of the above-described hindered amine-based light stabilizer include 2,2,6,6-tetramethyl-4-piperidyl stearate, 1,2,2,6,6-pentamethyl-4-piperidyl stearate, 2,2,6,6-tetramethyl-4-piperidylbenzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyemalonate, 1-(2-hydroxyethyl)-2,2,6,6-tetramethyl-4-piperidinol/dimethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8-12-tetraazadodecane, 1,6,11-tris[2,4-bis(N-butyl-N-(2,2,6,6-tetramethyl-4-piperidyl)amino)-s-triazine-6-yl] aminoundecane, 1,6,11-tris[2,4-bis(N-butyl-N-(1,2,2,6,6-pentamethyl-4-piperidyl)amino)-s-triazine-6-yl] aminoundecane, bis{4-(1-octyloxy-2,2,6,6-tetramethyl)piperidyl}decanedionate, bis{4-(2,2,6,6-tetramethyl-1-undecyloxy)piperidyl}carbonate and TINUVIN NOR371 manufactured by Ciba Specialty Chemicals K.K.

The above-described hindered amine-based light stabilizer is used in an amount of preferably 0.001 to 5 parts by mass, more preferably 0.005 to 0.5 parts by mass, with respect to 100 parts by mass of the above-described polymer.

Examples of the above-described heavy metal inactivator include salicylamide-1,2,4-triazol-3-yl, bis-salicylic acid hydrazide, dodecanedioyl bis(2-(2-hydroxybenzoyl)hydrazide) and bis(3-(3,5-di-t-butyl-4-hydroxyphenyl)propionic acid)hydrazide. The heavy metal inactivator is used in an amount of preferably 0.001 to 10 parts by mass, more preferably 0.05 to 5 parts by mass, with respect to 100 parts by mass of the above-described polymer.

Examples of the above-described nucleating agent include metal carboxylates such as sodium benzoate, aluminum 4-tert-butylbenzoate, sodium adipate and 2-sodiumbicyclo[2.2.1]heptane-2,3-dicarboxylate; metal phosphates such as sodium-bis(4-tert-butylphenyl)phosphate, sodium-2,2'-methylenebis(4,6-di-tert-butylphenyl)phosphate and lithium-2,2'-methylenebis(4,6-di-tert-butylphenyl)phosphate; polyhydric alcohol derivatives such as dibenzylidene sorbitol, bis(methylbenzylidene)sorbitol, bis(p-ethylbenzylidene)sorbitol and bis(dimethylbenzylidene)sorbitol; and amide compounds such as N,N,N''-tris[2-methylcyclohexyl]-1,2,3-propane tricarboxyamide (RIKACLEAR PC1), N,N',N''-tricyclohexyl-1,3,5-benzene tricarboxyamide, N,N'-dicyclohexyl-naphthalene dicarboxyamide and 1,3,5-tri(dimethylisopropoylamino)benzene.

The above-described nucleating agent is used in an amount of preferably 0.001 to 10 parts by mass, more preferably 0.005 to 5 parts by mass, with respect to 100 parts by mass of the above-described polymer.

Examples of the above-described flame retardant include aromatic phosphates such as triphenyl phosphate, tricresyl phosphate, trixylenyl phosphate, cresyldiphenyl phosphate, cresyl-2,6-xylenyl phosphate and resorcinol bis(diphenylphosphate); phosphates such as divinyl phenylphosphate, diallyl phenylphosphate and (1-butenyl)phenylphosphonate; phosphinates such as phenyl diphenylphosphinate, methyl diphenylphosphinate and 9,10-dihydro-9-oxa-10-phosphaphenanthlene-10-oxide derivatives; phosphazene compounds such as bis(2-allylphenoxy)phosphazene and dicresylphosphazene; phosphorus-based flame retardants such as melamine phosphate, melamine pyrophosphate, melamine polyphosphate, melamine polyphosphate, ammonium polyphosphate, phosphorus-containing vinylbenzyl compounds and red phosphorus; metal hydroxides such as magnesium hydroxide and aluminum hydroxide; and bromine-based flame retardants such as brominated bisphenol A-type epoxy resin, brominated phenol novolac-type epoxy resin, hexabromobenzene, pentabromotoluene, ethylenebis(pentabromophenyl), ethylenebis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromo bisphenol A-type dimethacrylate, pentabromobenzyl acrylate and brominated styrene.

The above-described flame retardant is used in an amount of preferably 1 to 70 parts by mass, more preferably 10 to 30 parts by mass, with respect to 100 parts by mass of the above-described polymer.

Preferred examples of the above-described filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, mica, silica, alumina, potassium titanate whiskers, wollastonite and fibrous magnesium oxysulfate. It is preferred that the filler have an average particle size (in the case of a spherical or flat filler) or an average fiber diameter (in the case of a needle-form or fibrous filler) of not greater than 5 µm.

The amount of the above-described filler to be used can be set as appropriate in a range where the present invention is not adversely affected.

The above-described lubricant is added for the purpose of imparting the surface of the resulting molded article with lubricity and improving the effect of preventing the molded article from being damaged. Examples of such lubricant include unsaturated fatty acid amides such as oleic acid amide and erucic acid amide; and saturated fatty acid amides such as behenic acid amide and stearic acid amide. These lubricants may be used individually, or two or more thereof may be used in combination.

The above-described lubricant(s) is/are added in an amount of preferably 0.03 to 2 parts by mass, more preferably 0.04 to 1 part by mass, with respect to 100 parts by mass of the above-described polymer. When the amount is less than 0.03 parts by mass, the desired lubricity may not be attained, while when the amount is greater than 2 parts by mass, the lubricant component may bleed out to the surface of the resulting molded article of the polymer, causing deterioration of the physical properties.

The above-described antistatic agent is added for the purpose of reducing the electrostatic property of the resulting molded article and preventing adhesion of dust caused by electrostatic charge. As the antistatic agent, there are available a variety of antistatic agents including cationic, anionic and non-ionic antistatic agents. Preferred examples of the antistatic agent include polyoxyethylene alkylamines, polyoxyethylene alkyl amides, fatty acid esters thereof and fatty acid esters of glycerin. These antistatic agents may be used individually, or two or more thereof may be used in combination. Further, the antistatic agent(s) is/are added in an amount of preferably 0.03 to 2 parts by mass, more preferably 0.04 to 1 part by mass, with respect to 100 parts by mass of the above-described polymer. When the amount is excessively small, the antistatic effect becomes insufficient. On the other hand, when the amount is excessively large, the antistatic agent may bleed out to the surface and/or cause deterioration of the physical properties of the polymer.

The use of the polymer obtained by the present invention is not particularly restricted and the polymer can be molded by known extrusion molding, injection molding, hollow molding, blow molding or the like into the form of a film, a sheet or the like. The resulting molded article can be used in automobile parts, home electric appliances, construction materials, agricultural materials, packaging materials, daily miscellaneous goods, toys and the like.

EXAMPLES

The present invention will now be described in more detail by way of examples and comparative examples; however, the present invention is not restricted thereto.

Examples 1-1 to 1-3

Preparation of Solid Ti Catalyst Component

Anhydrous magnesium chloride (4.76 g; 50 mmol), decane (25 ml) and 2-ethylhexyl alcohol (23.4 ml; 150 mmol) were allowed to react with heating at 130° C. for 2 hours to obtain a uniform solution. Then, 1.11 g (7.5 mmol) of phthalic anhydride was added to the thus obtained solution and the resultant was further allowed to react with stirring at 130° C. for 1 hour, thereby dissolving the phthalic anhydride in the uniform solution. After cooling the thus obtained uniform solution to room temperature, the whole amount of the uniform solution was added dropwise over a period of 1 hour to 200 ml (1.8 mol) of titanium tetrachloride maintained at −20° C. Thereafter, the temperature of the resulting mixture was raised to 110° C. over a period of 4 hours and once the temperature reached 110° C., 2.68 ml (12.5 mmol) of diisobutyl phthalate was added and the resultant was maintained at the same temperature for 2 hours with stirring. After the completion of this 2-hour reaction, solids were collected by hot-filtration and re-suspended in 200 ml of titanium tetrachloride and the resulting suspension was again allowed to react with heating at 110° C. for 2 hours. After the completion of the reaction, solids were again collected by hot-filtration and then thoroughly washed with decane and hexane at 110° C. until no free titanium compound was detected in the washings, thereby obtaining a solid Ti catalyst component. The solid Ti catalyst component synthesized by the above-described production method was stored in the form of a heptane slurry; however, a portion thereof was taken out and dried in order to examine the catalyst composition. The composition of the thus obtained solid Ti catalyst component was found to be as follows: 3.1% by weight of titanium, 56.0% by weight of chlorine; 17.0% by weight of magnesium and 20.9% by weight of isobutyl phthalate.

Preparation of Phenoxide Solution

Heptane (9.9 ml), triethyl aluminum (110 mg) and the phenolic antioxidant shown in Table 1 (330 mg) were mixed with stirring to mask the phenolic antioxidant and prepare a phenoxide solution having a phenolic antioxidant concentration of 33 mg/mL.

Polymerization

To an autoclave whose atmosphere was replaced with nitrogen, 600 mL of heptane, 297 mg of triethyl aluminum, 10 mL of the thus obtained phenoxide solution, 0.26 mmol of dicyclopentyldimethoxysilane and the heptane slurry of the solid Ti catalyst component (13 μmol in terms of Ti) were successively added. The atmosphere inside the autoclave was then replaced with propylene and pre-polymerization was performed under a propylene pressure of 1 kgf/cm$^2$G at 50° C. for 5 minutes. After purging propylene, 340 ml of hydrogen (23° C.) was blown into the autoclave and the temperature was raised to 70° C. to perform polymerization reaction under a propylene pressure of 6 kgf/cm$^2$G at 70° C. for 1 hour. After replacing the atmosphere in the system with nitrogen gas and quenching the polymerization reaction with an addition of 5 ml of ethanol at 40° C., the solvent was removed under reduced pressure at 50° C. and the resulting polymer was then dried in vacuum at 40° C. for 5 hours to obtain polypropylene powder.

Comparative Example 1-1

Polypropylene powder was obtained in the same manner as in Examples 1-1 to 1-3, except that no phenolic antioxidant was added at the time of performing the polymerization (see Table 1).

Evaluation of Effects on Polymerization Behavior

The effects on the polymerization behavior were evaluated based on the yield and molecular weight of the thus obtained polymers. The catalytic activity (g-PP/g-catalyst) represents the amount of polymerization with respect to 1 g of the catalyst. As for the molecular weight, the weight-average molecular weight and the degree of dispersion (Mw/Mn) were measured by gel permeation chromatography (apparatus: Model GPC2000 manufactured by Waters Corporation; columns: two Styragel HT6E columns and one Styragel HT2 column, which are manufactured by Waters Corporation; measuring temperature: 135° C.; solvent: o-dichlorobenzene; concentration: 6 mg/10 g).

In accordance with the ISO1133 standard, the melt flow rate (MFR) of each of the thus obtained polymers was determined by extruding the resin molten at 230° C. with a load of 2.16 kg and defining the discharged amount of the resin in terms of 10 minutes as the melt flow rate (MFR).

TABLE 1

| | Phenolic antioxidant | Effects on catalytic activity | | | |
|---|---|---|---|---|---|
| | | Catalytic activity (g-PP/g-catalyst) | Mw | Mw/Mn | MFR |
| Example 1-1 | AO-1 | 8,300 | 445,000 | 4.2 | 9.9 |
| Example 1-2 | AO-2 | 8,200 | 443,000 | 4.2 | 10.0 |
| Example 1-3 | AO-3 | 8,300 | 444,000 | 4.2 | 9.9 |
| Comparative Example 1-1 | — | 8,200 | 444,000 | 4.2 | 10.1 |

1) AO-1: 2-(1,1-dimethylethyl)-6-methyl-4-[3-[[2,4,8,10-tetrakis(1,1-dimethylethyl)dibenzo[d,f][1,3,2]dioxaphosphepin-6-yl]oxy]propyl]phenol
2) AO-2: 2-methyl-4,6-bis((octylthio)methyl)phenol
3) AO-3: dioctadecyl[[3,5-bis(1,1-dimethylethyl)-4-hydroxyphenyl]methyl]phosphonate From Table 1, it was confirmed that, by the masking with the organic aluminum compound, polymerization of the monomer having an ethylenically unsaturated bond can be performed without adversely affecting the catalytic activity even when the phenolic antioxidant according to the present invention is added at the time of the polymerization.

Examples 2-1 to 2-3 and Comparative Example 2-2

A polymer was obtained in the same manner as in the above-described Examples 1-1 to 1-3 with an addition of the stabilizer composition shown in Table 2 or Table 3 at the time of performing the polymerization. To the thus obtained polymer, 0.05 parts by mass of calcium stearate was added, and the resultant was mixed. Thereafter, the steps of loading the resulting mixture to a biaxial extruder (Laboplast Mill Micro, manufactured by Toyo Seiki Seisaku-sho, Ltd.), extruding at a melt temperature of 230° C., making the extruded mixture into the form of a pellet and then loading the pellet back to the biaxial extrude were repeated 5 times. It is noted here that the added amount of the stabilizer composition and that of calcium stearate are both indicated in terms of an amount (parts by mass) with respect to 100 parts by mass of the obtained polymer.

Comparative Examples 2-1 and 2-3 to 2-5 and Reference Examples 1 to 3

To the polymer which was obtained in the above-described Comparative Example 1-1 without an addition of a stabilizer composition, the stabilizer composition shown in Table 3 or Table 4 and 0.05 parts by mass of calcium stearate were added, and the resultant was mixed. Thereafter, in the same manner as in the above-described Example 2-1, the processing using the biaxial extruder was repeated 5 times. It is noted here that the added amount of the stabilizer composition and that of calcium stearate are both indicated in terms of an amount (parts by mass) with respect to 100 parts by mass of the obtained polymer.

Evaluation of Stabilization Effect

For each of the polymers before the above-described extrusion process and the pellets after five extrusions, the molecular weight was measured to evaluate the stabilization effect. As for the molecular weight, the weight-average molecular weight was measured by gel permeation chromatography (apparatus: Model GPC2000 manufactured by Waters Corporation; columns: two Styragel HT6E columns and one Styragel HT2 column, which are manufactured by Waters Corporation; measuring temperature: 135° C.; solvent: o-dichlorobenzene; concentration: 6 mg/10 g).

The results are shown in Tables 2 to 4 below.

TABLE 2

| | Stabilizer composition | Added amount (parts by mass) | Method of addition | Stabilization effect | |
|---|---|---|---|---|---|
| | | | | Before extrusion | After 5 extrusions |
| Example 2-1 | AO-1 P-1[4] | 0.0050 0.015 | at the time of polymerization | 446,000 | 406,000 |
| Example 2-2 | AO-2 P-1[4] | 0.0050 0.015 | at the time of polymerization | 445,000 | 402,000 |
| Example 2-3 | AO-3 P-1[4] | 0.0050 0.015 | at the time of polymerization | 444,000 | 396,000 |

[4] P-1: tris(2,4-di-t-butylphenyl)phosphite

TABLE 3

| | Stabilizer composition | Added amount (parts by mass) | Method of addition | Stabilization effect | |
|---|---|---|---|---|---|
| | | | | Before extrusion | After 5 extrusions |
| Comparative Example 2-1 | —[5] | —[5] | —[5] | 444,000 | 298,000 |
| Comparative Example 2-2 | AO-4[6] P-1 | 0.0050 0.015 | at the time of polymerization | 442,000 | 371,000 |
| Comparative Example 2-3 | AO-1 P-1 | 0.0050 0.015 | at the time of granulation | 444,000 | 338,000 |
| Comparative Example 2-4 | AO-2 P-1 | 0.0050 0.015 | at the time of granulation | 444,000 | 342,000 |
| Comparative Example 2-5 | AO-3 P-1 | 0.0050 0.015 | at the time of granulation | 444,000 | 334,000 |

[5] Without addition of stabilizer composition
[6] AO-4: calcium bis[ethyl(3,5-di-t-butyl-4-hydroxybenzylphosphonate)]

TABLE 4

| | Stabilizer composition | Added amount (parts by mass) | Method of addition | Stabilization effect | |
|---|---|---|---|---|---|
| | | | | Before extrusion | After 5 extrusions |
| Reference Example 1 | AO-1 P-1 | 0.050 0.050 | at the time of granulation | 444,000 | 401,000 |
| Reference Example 2 | AO-2 P-1 | 0.050 0.050 | at the time of granulation | 444,000 | 402,000 |
| Reference Example 3 | AO-3 P-1 | 0.050 0.050 | at the time of granulation | 444,000 | 397,000 |

From the results of Comparative Example 2-2 shown in Table 3, it was confirmed that the stabilization effect was poor when a phenolic antioxidant different from the one according to the production method of the present invention was used. In addition, from the results of Comparative Examples 2-3 to 2-5 shown in Table 3, it was confirmed that, even in those cases where the phenolic antioxidant according to the production method of the present invention was used, if it was added at the time of granulation, the stabilization effect was poor.

In contrast, from the results of Examples 2-1 to 2-3 shown in Table 2, those polymers that were obtained in accordance with the production method of the present invention were confirmed to have excellent stabilization effect.

Furthermore, according to the comparisons between Example 2-1 shown in Table 1 and Reference Example 1 shown in Table 4, between Example 2-2 shown in Table 2 and Reference Example 2 shown in Table 4 and between Example 2-3 shown in Table 2 and Reference Example 3 shown in Table 4, it was found that, in the method of producing a stabilized polymer according to the present invention, as compared to those cases where the stabilizer composition was added in the granulation step after the polymerization, the stabilization effect was exhibited at a comparable level despite the added amount of the stabilizer composition was only one-fifth.

The invention claimed is:

1. A method of producing a stabilized polymer, comprising:
mixing at least one phenolic antioxidant, which is represented by the following Formula (I), (II) or (III) below, with an organic aluminum compound, thereby coating the phenolic antioxidant with the organic aluminum compound; and then
mixing the coated phenolic antioxidant with a catalyst system or a polymerization system before or during polymerization of a monomer having an ethylenically unsaturated bond:

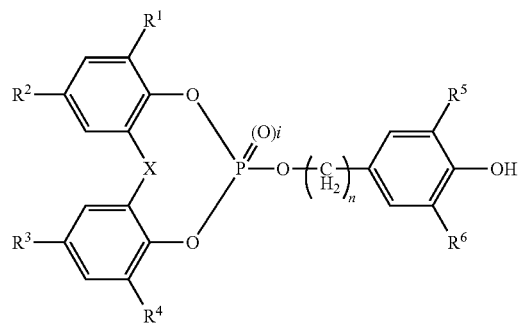

wherein $R^1$, $R^2$, $R^3$, $R^4$, $R^5$ and $R^6$ each independently represent a hydrogen atom, an alkyl group having 1 to 5 carbon atoms, which is optionally branched or substituted, a cycloalkyl group having 5 to 8 carbon atoms, which is optionally substituted, or an aryl group having 6 to 12 carbon atoms, which is optionally substituted; X represents a direct bond or an alkylidene group having 1 to 4 carbon atoms; i represents a number of 0 or 1; and n represents a number of 1 to 6;

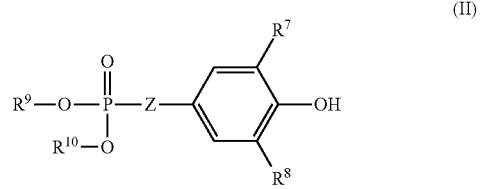

wherein $R^7$ and $R^8$ each independently represent a hydrogen atom, an alkyl group having 1 to 5 carbon atoms, which is optionally branched or substituted, a cycloalkyl group having 5 to 8 carbon atoms, which is optionally substituted, or an aryl group having 6 to 12 carbon atoms, which is optionally substituted; $R^9$ and $R^{10}$ each independently represent an alkyl group having 1 to 18 carbon atoms, which is optionally branched or substituted, or a metal atom, wherein when the metal atom is a divalent or higher-valent metal, $R^9$ and $R^{10}$ are optionally the same metal atom; and Z represents an alkylene group having 1 to 4 carbon atoms, which is optionally branched or substituted;

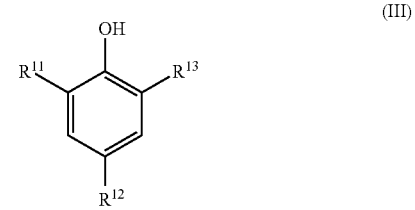

wherein $R^{11}$, $R^{12}$ and $R^{13}$ each independently represent an alkyl group having 1 to 18 carbon atoms, which is optionally branched or substituted or an ether, a thioether or a disulfide comprising alkyl groups having 2 to 18 carbon atoms, which is optionally branched, with the proviso that at least one of $R^{11}$, $R^{12}$ and $R^{13}$ is a thioether or a disulfide comprising alkyl groups having 2 to 18 carbon atoms, which is optionally branched;
wherein said phenolic antioxidant is added in an amount of 0.005 to 0.3 parts by mass with respect to 100 parts by mass of a polymer obtained by said polymerization of said monomer having an ethylenically unsaturated bond.

2. The method according to claim 1, wherein said organic aluminum compound is a trialkyl aluminum.

3. The method according to claim 1, which further comprises the step of adding a phosphorus-based antioxidant to said catalyst system or said polymerization system before or during said polymerization of said monomer having an ethylenically unsaturated bond.

4. The method according to claim 1, wherein said monomer having an ethylenically unsaturated bond is an α-olefin.

5. The method according to claim 1, wherein no polymerization catalyst is included in the first mixing step.

* * * * *